(12) United States Patent
Bartek et al.

(10) Patent No.: US 8,877,015 B2
(45) Date of Patent: Nov. 4, 2014

(54) PROCESS CONTROL BY BLENDING BIOMASS FEEDSTOCKS

(75) Inventors: Robert Bartek, Centennial, CO (US); Steve Yanik, Colorado Springs, CO (US)

(73) Assignee: KiOR, Inc., Pasadena, TX (US)

( * ) Notice: Subject to any disclaimer, the term of this patent is extended or adjusted under 35 U.S.C. 154(b) by 532 days.

(21) Appl. No.: 13/284,321

(22) Filed: Oct. 28, 2011

(65) Prior Publication Data

US 2012/0160658 A1   Jun. 28, 2012

Related U.S. Application Data

(60) Provisional application No. 61/410,243, filed on Nov. 4, 2010.

(51) Int. Cl.
*C10B 53/02* (2006.01)
*C10G 1/00* (2006.01)
*C10C 5/00* (2006.01)
*C10L 1/02* (2006.01)

(52) U.S. Cl.
CPC . *C10C 5/00* (2013.01); *Y02E 50/14* (2013.01); *C10L 1/02* (2013.01); *C10B 53/02* (2013.01); *C10G 2300/1014* (2013.01)
USPC ...... 201/1; 201/21; 201/25; 202/96; 202/270; 585/240; 585/242

(58) Field of Classification Search
CPC ............. C10B 53/02; C10L 1/02; C10C 5/00; C10G 2300/1014; G01N 33/22; G01N 33/222; G01N 33/46
USPC ....................... 201/1, 21, 25; 202/82, 96, 270; 585/240, 242
See application file for complete search history.

(56) References Cited

U.S. PATENT DOCUMENTS 4,370,201 A * 1/1983 Lowenhaupt ..................... 201/1

* cited by examiner

*Primary Examiner* — Jill Warden
*Assistant Examiner* — Joye L Woodard
(74) *Attorney, Agent, or Firm* — Hovey Williams LLP

(57) ABSTRACT

A process and system is disclosed for optimizing a key parameter of a biomass feedstock that enhances bio-oil production. The process and system involves optimizing the values of the key parameter in multiple biomass feedstocks by regulating their feed rates and blending those feedstocks to produce a cumulative biomass feedstock with an optimal value for the key parameter. The key parameter in the biomass feedstocks is measured and the feed rates of the multiple biomass feedstocks are adjusted in order to produce a cumulative biomass feedstock exhibiting optimal values for the desired key parameter. The key parameters can include compositional properties, such as lignin content or mineral content, and/or fluidization properties of the biomass materials, such as density, particle cohesion force, or particle size.

24 Claims, 2 Drawing Sheets

PROCESS CONTROL BY BLENDING BIOMASS FEEDSTOCKS

BACKGROUND

1. Field of the Invention

The present invention relates generally to the optimizing of a key parameter in a blended biomass feedstock, wherein the optimized blended biomass feedstock can be converted into high quality bio-oil and byproducts.

2. Description of the Related Art

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Despite advancements in the aforementioned biomass conversion processes, the quality and yield of bio-oil produced during the various processes depends greatly on the biomass feedstock used. It is known that various properties of the biomass feedstock greatly affect the quality and quantity of the produced bio-oil. For instance, it is known that the cellulose, hemicellulose, lignin, and mineral contents of the biomass feedstock can greatly influence bio-oil quality and yield. Unfortunately, most of the biomass materials used for conversion feedstocks exhibit deficiencies in many of the desirable biomass properties and thus adversely affect the quality and yield of produced bio-oil.

Accordingly, there is a need for a biomass feedstock with optimal properties that maximizes the quality and yield of the produced bio-oil.

SUMMARY OF THE INVENTION

In one embodiment, the present invention is directed to a process for producing bio-oil from biomass comprising: (a) selecting at least one key parameter for an optimal biomass feedstock; (b) determining an optimal value A for the key parameter; (c) determining a maximum acceptable deviance B from the optimal value A; (d) providing a first biomass feedstock having a value C for the key parameter, wherein C is greater than or equal to A; (e) providing a second biomass feedstock having a value D for the key parameter, wherein D is less than A; (f) introducing a cumulative biomass feedstock comprising the first biomass feedstock and the second biomass feedstock into a biomass conversion reactor, wherein the cumulative biomass feedstock has a combined average value E for the key parameter, wherein the absolute value of A minus E is less than B; and (g) thermochemically converting the cumulative biomass feedstock in the biomass conversion reactor to thereby produce a bio-oil.

In another embodiment, the present invention is directed to a biomass conversion process comprising: (a) determining an optimal lignin content for an optimal biomass feedstock; (b) providing a first biomass feedstock having a first lignin content that is greater than the optimal lignin content; (c) providing a second biomass feedstock having a second lignin content that is less than the optimal lignin content; (d) introducing the first and second biomass feedstocks into a biomass conversion reactor at respective first and second feed rates, wherein the ratio of the first and second feed rates is based at least partly on the first and second lignin contents, wherein the combined average lignin content of the first and second biomass feedstocks introduced into the biomass conversion reactor is within 30 percent of the optimal lignin content; and (e) converting the first and second biomass feedstocks into bio-oil in the biomass conversion reactor.

In a further embodiment, the present invention is directed to a biomass conversion system comprising: a first biomass source for providing a first biomass feedstock; a first biomass transport system coupled to the first biomass source and operable to transport the first biomass feedstock away from the first biomass source at a first feed rate, wherein the first biomass transport system comprises a first metering device for controlling the first feed rate; a second biomass source for providing a second biomass feedstock; a second biomass transport system coupled to the second biomass source and operable to transport the second biomass feedstock away from the second biomass source at a second feed rate, wherein the second biomass transport system comprises a second metering device for controlling the second feed rate; one or more analyzers for determining the value of at least one key parameter of first and second biomass feedstocks; a controller, having an operator entered optimal key parameter set point, for determining the first and second feed rates based on a comparison of said optimal key parameter set point with the determined values of the key parameter for the first and second biomass feedstocks; and a biomass conversion reactor for receiving the first and second biomass feedstocks transported by the first and second biomass transport systems.

BRIEF DESCRIPTION OF THE FIGURES

Embodiments of the present invention are described herein with reference to the following drawing figures, wherein.

DETAILED DESCRIPTION

Figure 1:
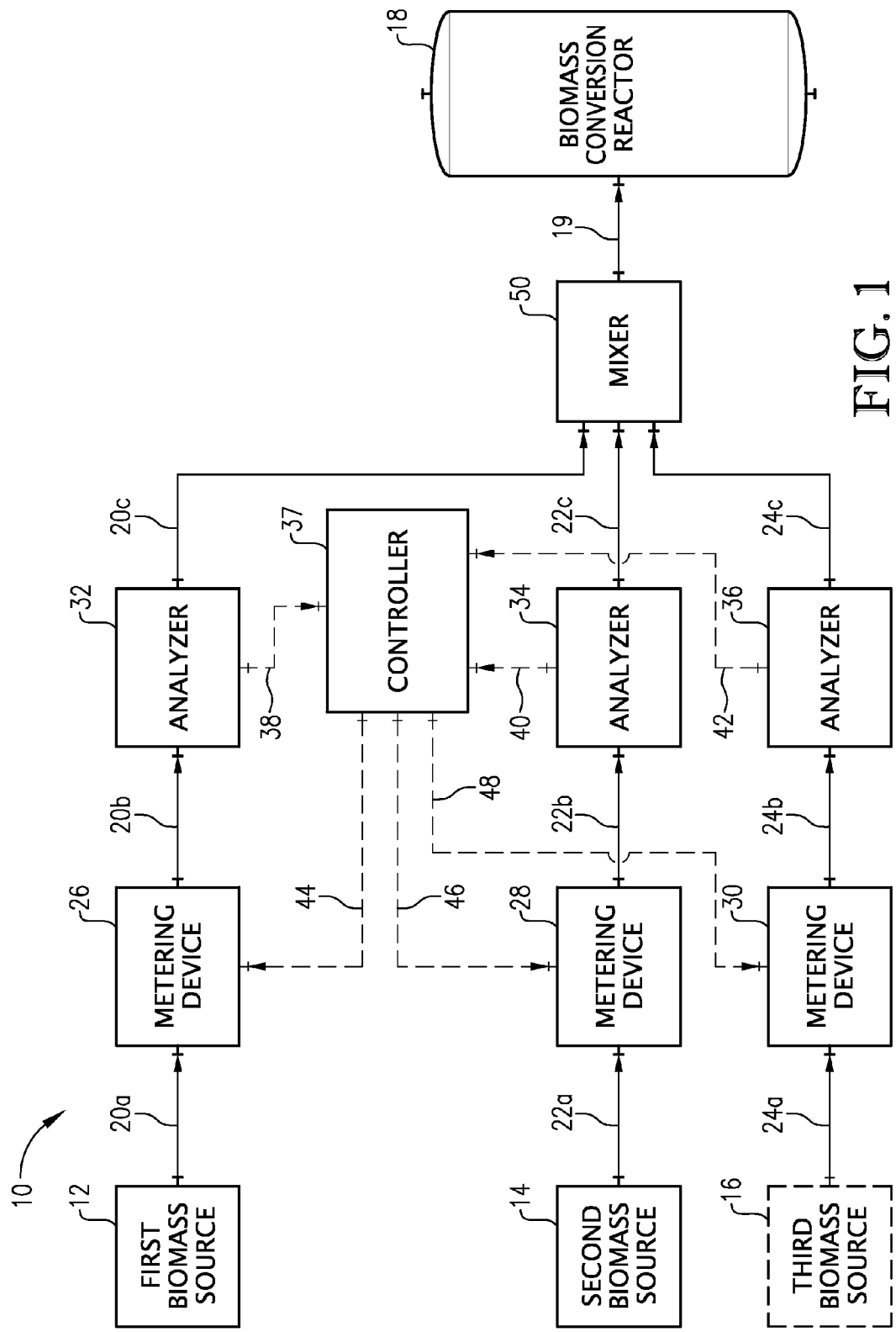
FIG. 1 is a schematic diagram of a biomass conversion system according to one embodiment of the present invention, where multiple biomass feedstocks are mixed prior to introduction into a biomass conversion reactor.
Figure 2:
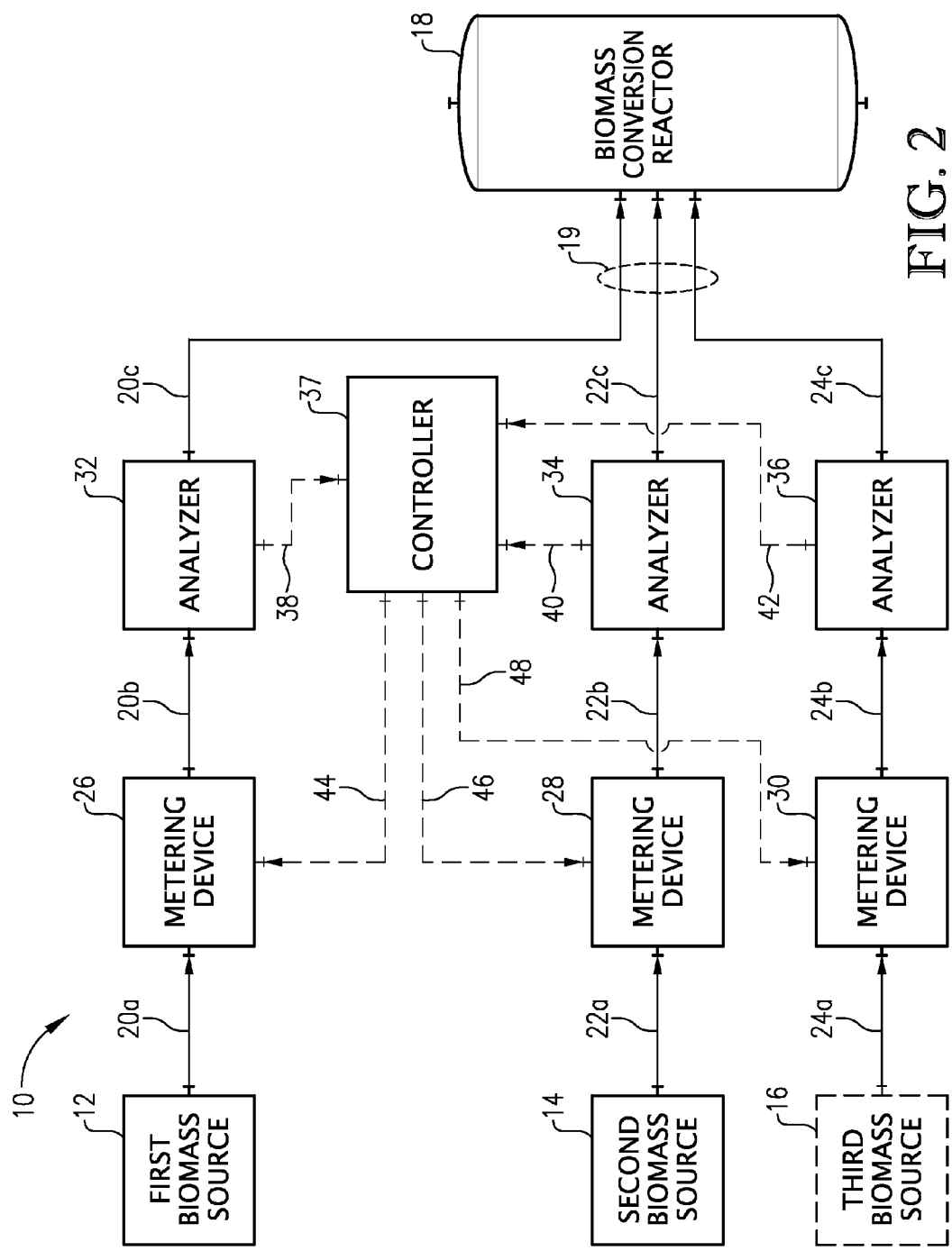
FIG. 2 is a schematic diagram of a biomass conversion system according to another embodiment of the present invention, where multiple biomass feedstocks are introduced into a biomass conversion reactor at separate inlets.

FIGS. 1 and 2 depict biomass conversion systems 10 that transport biomass from multiple sources 12, 14, 16 to a single biomass conversion reactor 18. The biomass feedstocks from the different sources 12, 14, 16 have different properties, and the systems 10 depicted in FIGS. 1 and 2 are configured to control the feed rates of the multiple biomass feedstocks in order to provide a combined/cumulative biomass feedstock 19 with optimal properties that maximize the quality and/or yield of bio-oil. It should be understood that the biomass conversion systems 10 shown in FIGS. 1 and 2 are just two examples of systems within which the present invention can be embodied. The present invention may find application in a wide variety of other systems where it is desirable to efficiently and effectively optimize various properties of a cumulative biomass feedstock. The exemplary biomass conversion systems 10 illustrated in FIGS. 1 and 2 will now be described in detail.

The biomass conversion system 10 of FIG. 1 includes at least a first biomass source 12, a second biomass source 14, and, optionally, a third biomass source 16 for supplying a first biomass feedstock 20a, a second biomass feedstock 22a, and, optionally, a third biomass feedstock 24a. Although FIG. 1 only depicts three biomass sources 12, 14, and 16, it should be understood that the system 10 of FIG. 1 can employ more than three biomass sources. The first, second, and third biomass sources 12, 14, and 16 can each be, for example, a hopper, storage bin, railcar, over-the-road trailer, or any other device that may hold or store biomass. The biomass supplied by the first, second, and third biomass sources 12, 14, and 16 can be in the form of solid particles having a minimum particle size of 200, 100, or 50 microns and a maximum particle size of 5,000, 2,000, or 1,000 microns. The biomass can be any type of biomass that may be converted into a bio-oil. Generally, the biomass can be solid biomass materials comprising cellulosic materials, in particular lignocellulosic materials, because of the abundant availability of such materials and their low cost. The solid biomass feed can comprise components selected from the group consisting of lignin, cellulose, hemicellulose, and/or combinations thereof. Suitable cellulose-containing materials can include, for example, aquatic biomass, paper waste, herbaceous plants, and/or cotton linters. Examples of suitable lignocellulosic materials can include forestry waste such as wood chips, saw dust, pulping waste, and tree branches; agricultural waste such as corn stover, wheat straw, and bagasse; and/or energy crops such as eucalyptus, switch grass, and coppice. The first, second, and third biomass sources 12, 14, and 16 can contain the same biomass materials or each may contain different biomass materials. Any one of the biomass sources 12, 14, 16 can contain only one type of biomass material or contain a combination of biomass materials.

In one embodiment, the first biomass source 12, second biomass source 14, and/or third biomass source 16 can include a system for pretreating the biomass materials. Such biomass pretreatments may include drying, roasting, torrefaction, demineralization, steam explosion, mechanical agitation, impregnation with acids, bases, or salts, and/or any combination thereof.

Referring again to FIG. 1, the first biomass feedstock 20a can be introduced into a first metering device 26, the second biomass feedstock 22a can be introduced into a second metering device 28, and the optional third biomass feedstock 24a can be introduced into a third metering device 30. The metering devices can be any device capable of regulating the feed rates of the biomass feedstocks 20a, 22a, 24a.

Subsequent to the leaving the metering devices, the first biomass feedstock 20b can be introduced into a first analyzer 32, the second biomass feedstock 22b can be introduced into a second analyzer 34, and the optional third biomass feedstock 24b can be introduced into a third analyzer 36. The analyzers 32, 34, 36 evaluate the biomass feedstocks and determine values for a predetermined key parameter in the biomass feedstocks. The information gathered by the analyzers 32, 34, 36 is directly relayed to a controller 37 via lines 38, 40, and 42, respectively. The analyzers can be, for example, any device known in the art that is capable of measuring and analyzing key parameters of biomass materials, including online analyzers utilizing spectroscopic methods.

One or more key parameters can be selected and optimized for the cumulative biomass feedstock 19 introduced into the biomass conversion reactor 18. The key parameters can include a compositional property of the biomass, a fluidization property of the biomass, and/or any combinations thereof. As used herein "compositional property" refers to properties associated with the compositional make up of the biomass feedstock that have an effect on the yield and/or quality of the bio-oil produced. A compositional property can include, for example, lignin content, mineral content, carbon content, hydrogen content, oxygen content, natural oil content (e.g., triglycerides), hemicellulose content, cellulose content, extractives content (e.g., terpenes), water content, and/or ratios of any two of the preceding properties. As used herein "fluidization property" refers to any property of the biomass feedstock that affects its ability to be properly fluidized or transported in the biomass conversion reactor 18. Examples of fluidization properties can include, for example, density, particle cohesion force, and/or particle size.

One or more key parameters can be selected amongst the key parameters listed above to be regulated in the first biomass feedstock 20a, the second biomass feedstock 22a, and the optional third biomass feedstock 24a in order to produce a cumulative biomass feedstock 19 with an optimal value for the key parameter. Based on the selected key parameter, an optimal value A is determined for the key parameter prior to starting the process. The optimal value A of the key parameter is the value at which the biomass feedstock produces the desired yield and/or quality of bio-oil. The optimal value A can be entered by an operator into the controller 37 as a set point against which measured values of the key parameter can subsequently be compared. A maximum acceptable deviation from the optimal value A is predetermined before the process begins. The maximum acceptable deviance B represents the maximum deviation from the optimal value A that can still result in a biomass feedstock that produces the desired yield and quality of bio-oil. The maximum acceptable deviance B can be equal to or less than 30, 20, 10, or 5 percent of the optimal value A.

As depicted in FIG. 1, the first analyzer 32, second analyzer 34, and third analyzer 36 can measure the values for the key parameter(s) in the biomass feedstocks 20b, 22b, 24b and relay this information to the controller 37 via lines 38, 40, 42, respectively. The first biomass feedstock 20b can have a value C for the key parameter(s), which is greater than or equal to the optimal value A (i.e., $C \geq A$). The second biomass feedstock 22b can have a value D for the key parameter(s), which is less than the optimal value A (i.e., $D<A$). The optional third biomass feedstock 24b can have a value F for the key parameter(s), which is less than C and greater than D (i.e., $C>F>D$). As is described below, at least the first biomass feedstock 20c, the second biomass feedstock 22c, and the optional third biomass feedstock 24c are combined to form the cumulative biomass feedstock 19 that has a combined average value E for the chosen key parameter. Ideally, the absolute value of the optimal value A minus the combined average value E is less than the maximum acceptable deviance B (i.e., $|A-E|<B$).

As illustrated in FIG. 1, the controller 37 receives the biomass feedstock data (e.g., C, D, and/or F) from the analyzers 32, 34, 36 and adjusts the feed rates for the biomass feedstocks 20b, 22b, 24b accordingly. The controller 37 attempts to optimize the combined average value E of the key parameter in the cumulative biomass feedstock 19. The controller 37 sends these regulatory signals to the metering devices 26, 28, 30 via lines 44, 46, 48, respectively. The controller 37 can be, for example, a human operator and/or any automatic controller known in the art configured to receive signals from analyzers, compare the received signals against predetermined parameters (e.g., the optimal key parameter value A and/or the maximum key parameter deviance B), and generate a control signal based on the comparison of the received signal and predetermined parameter.

Referring again to FIG. 1, after leaving the analyzers 32, 34, 36, the biomass feedstocks 20c, 22c, 24c can be combined in a mixer 50 to produce the cumulative biomass feedstock 19 prior to being introduced into the biomass conversion reactor 18. The mixer 50 can be, for example, any type of conventional mixer known and used in the art.

The following is a hypothetical example applying the above values in a theoretical biomass feedstock and is not intended to limit the scope of the present invention. Prior to starting the process, the optimal lignin content (key parameter) for an optimal biomass feedstock (e.g., A=20 percent lignin by weight) and the maximum acceptable deviance (e.g., B=6 percent) are predetermined. The process is initiated and the analyzers 32, 34, 36 determine that the first biomass feedstock 20, which comprises a wood, has a lignin content that is greater than the optimal value (e.g., C=40 percent lignin by weight) and that the second biomass feedstock 22, which is selected from cotton linter, herbaceous plants, aquatic biomass, waste paper, and/or mixtures thereof, has a lignin content that is less than the optimal value (e.g., D=10 percent lignin by weight). The analyzers 32, 34, 36 send this data to the controller 37, wherein the feed rates for each biomass feedstock are adjusted so as to optimize the lignin content of the cumulative biomass feedstock 19. The controller 37 sends signals to the metering devices 26, 28, 30 to properly adjust the feed rates for each of the biomass feedstocks based on their respective values. After combining the first biomass feedstock 20 and the second biomass feedstock 22, the cumulative biomass feedstock 19 has a combined average value E of 22 percent lignin by weight. In this hypothetical, the cumulative biomass feedstock 19 has an acceptable lignin content that produces a high quality and yield of bio-oil and is within the maximum acceptable deviation (e.g., |A−E|<B; |20−22|=2 percent, which is less than 6 percent).

The first biomass feedstock 20c, the second biomass feedstock 22c, the optional third biomass feedstock 24c, and/or the cumulative biomass feedstock 19 can be combined with a catalytic material prior to being introduced into the biomass conversion reactor 18 in order to promote the conversion of biomass into bio-oil. Alternatively, the catalytic material may be introduced directly into the conversion reactor 18. The catalytic material can, for example, comprise a solid acid, such as a zeolite. Examples of suitable zeolites include ZSM-5 and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcites, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 18, they are not considered catalysts.

As depicted in FIG. 1, the cumulative biomass feedstock 19 is subjected to a conversion reaction that produces bio-oil.

The biomass conversion reactor 18 can facilitate different chemical conversion reactions such as fast pyrolysis, slow pyrolysis, liquefaction, gasification, or enzymatic conversion. The biomass conversion reactor 18 can be, for example, a fluidized bed reactor, a cyclone reactor, an ablative reactor, or a riser reactor.

In one embodiment, the conversion reactor 18 can be a riser reactor and the conversion reaction is fast pyrolysis. Fast pyrolysis can also include catalytic cracking. As used herein, "pyrolysis" refers to the chemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, product gas recycled from the biomass conversion process, or any combination thereof.

Fast pyrolysis is characterized by short residence times and rapid heating of the biomass feedstock. The residence times of the fast pyrolysis reaction can be, for example, less than 10 seconds, less than 5 seconds, or less than 2 seconds. Fast pyrolysis can occur at temperatures of at least 300° C., 400° C., or 500° C. and not more than 1,000° C., 800° C., or 700° C.

FIG. 2 illustrates an alternative embodiment of the biomass conversion system 10 used in the present invention. All of the components in FIG. 2 that have the same numerical reference as that in FIG. 1 have the same function and/or description as set forth above.

In the embodiment depicted in FIG. 2, the biomass conversion system 10 does not employ a mixer. In this embodiment, the first biomass feedstock 20c, second biomass feedstock 22c, and/or the optional third biomass feedstock 24c form the cumulative biomass feedstock 19, but are maintained separately from each other prior to introduction into the biomass conversion reactor 18. The biomass feedstocks are introduced via separate feed inlets and combined in the biomass conversion reactor 18.

EXAMPLE

Several different biomass feeds were fed to a biomass conversion reactor in the presence of a catalyst. The temperatures for the runs were greater than 800° F. Feed and product properties from such runs are presented in the Table below.

TABLE

| | BIOMASS FEED | | | | | |
|---|---|---|---|---|---|---|
| | SYP | SG | SB | CS | A | MG |
| Feed Properties: | | | | | | |
| Carbon (C), wt % dry | 51.0 | 48.2 | 49.8 | 47.8 | 50.4 | 48.4 |
| Hydrogen (H), wt % dry | 5.9 | 6.5 | 6.0 | 6.5 | 6.9 | 6.0 |
| Nitrogen (N), wt % dry | .2 | 0.5 | 0.4 | 1.4 | 6.5 | 0.4 |
| Oxygen (O), wt % dry | 42.9 | 44.8 | 43.8 | 44.3 | 36.2 | 45.2 |
| Moisture, wt % | 7.0 | 9.1 | 36.3 | 11.7 | 2.3 | 7.4 |
| Product: | | | | | | |
| Oil phase yield relative to SYP | 1.00 | 1.14 | 0.77 | 0.90 | 1.07 | 1.03 |
| Breakout: | | | | | | |
| C, wt % | 77.8 | 76.2 | 81.4 | 77.0 | 74.7 | 76.0 |
| H, wt % | 7.2 | 7.9 | 7.6 | 7.3 | 8.1 | 7.4 |
| N, wt % | 0.2 | 0.5 | 0.2 | 0.9 | 8.4 | 0.3 |
| O, wt % | 14.8 | 15.4 | 10.8 | 14.8 | 8.8 | 16.3 |
| Coke/Char yield | 1.00 | 0.95 | 0.85 | 1.10 | 1.30 | 0.84 |

TABLE-continued

| | BIOMASS FEED | | | | | |
|---|---|---|---|---|---|---|
| | SYP | SG | SB | CS | A | MG |
| relative to SYP | | | | | | |

SYP—Southern Yellow Pine
SG—Switchgrass
B—Sugarcane Bagasse
CS—Corn Stover
A—Algae
MG—*Miscanthus Giganteus*

As can be seen from the Table above, the feeds varied in carbon, hydrogen, nitrogen and oxygen concentration, and such variations resulted in varying bio-oil, water and coke yields. The carbon, hydrogen, nitrogen and oxygen concentrations of the bio-oil also varied. These results demonstrate that varying the feed compositions can have a direct impact on product yields and properties, allowing for flexibility in process operation.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

determine and assess the reasonably fair scope of the present invention as it pertains to any process or system not materially departing from but outside the literal scope of the invention as set forth in the following claims.

What is claimed is:

1. A process for producing bio-oil from biomass, said process comprising:
   (a) selecting at least one key parameter for an optimal biomass feedstock;
   (b) determining an optimal value A for said key parameter;
   (c) determining a maximum acceptable deviance B from said optimal value A;
   (d) providing a first biomass feedstock having a value C for said key parameter, wherein C is greater than or equal to A;
   (e) providing a second biomass feedstock having a value D for said key parameter, wherein D is less than A;
   (f) introducing a cumulative biomass feedstock comprising said first biomass feedstock and said second biomass feedstock into a biomass conversion reactor, wherein said cumulative biomass feedstock has a combined average value E for said key parameter, wherein the absolute value of A minus E is less than B; and
   (g) thermochemically converting said cumulative biomass feedstock in said biomass conversion reactor to thereby produce a bio-oil.

2. The process of claim 1 wherein said first and second biomass feedstocks are mixed prior to introduction into said biomass conversion reactor.

3. The process of claim 1 said first and second biomass feedstocks are maintained separate from another prior to introduction into said biomass conversion reactor.

4. The process of claim 1 wherein B is equal to or less than 30 percent of A.

5. The process of claim 1 wherein said key parameter is a compositional property or fluidization property of said optimal biomass feedstock.

6. The process of claim 1 wherein said key parameter is a compositional property of said optimal biomass feedstock.

7. The process of claim 6 wherein said compositional property is selected from the group consisting of lignin content, mineral content, carbon content, hydrogen content, oxygen content, natural oil content, hemicellulose content, cellulose content, extractives content, water content, and ratios of any two of the preceding properties.

8. The process of claim 6 wherein said compositional property is lignin content or mineral content.

9. The process of claim 1 wherein said key parameter is a fluidization property of said optimal biomass.

10. The process of claim 9 wherein said fluidization property is density, particle cohesion force, or particle size.

11. The process of claim 1 wherein one of said first and second biomass feedstocks is a wood, wherein the other of said first and second biomass feedstocks is selected from the group consisting of cotton linter, herbaceous plants, aquatic biomass, waste paper, and mixtures of two or more thereof.

12. The process of claim 1 further comprising providing a third biomass feedstock having a value F for said key parameter, wherein F is less than C and greater than D, wherein said cumulative biomass feedstock comprises said first, second, and third biomass feedstocks.

13. The process of claim 1 wherein said thermochemical conversion comprises catalytic pyrolysis in a riser reactor.

14. A biomass conversion process comprising:
   (a) determining an optimal lignin content for an optimal biomass feedstock;
   (b) providing a first biomass feedstock having a first lignin content that is greater than said optimal lignin content;
   (c) providing a second biomass feedstock having a second lignin content that is less than said optimal lignin content;
   (d) introducing said first and second biomass feedstocks into a biomass conversion reactor at respective first and second feed rates, wherein the ratio of said first and second feed rates is based at least partly on said first and second lignin contents, wherein the combined average lignin content of the first and second biomass feedstocks introduced into said biomass conversion reactor is within 30 percent of said optimal lignin content; and
   (e) converting said first and second biomass feedstocks into bio-oil in said biomass conversion reactor.

15. The process of claim 14 further comprising mixing said first and second biomass feedstocks prior to said introducing of step (d).

16. The process of claim 15 wherein said first biomass feedstock and/or said second biomass feedstock is subject to pretreatment prior to said mixing, wherein said pretreatment comprises torrefaction, drying, mechanical agitation, steam explosion, swelling with acids and/or bases, and/or demineralization.

17. The process of claim 14 wherein at least one of said first and second biomass feedstocks is a wood, wherein the other of said first and second biomass feedstocks is selected from the group consisting of cotton linter, herbaceous plants, aquatic biomass, waste paper, and mixtures thereof.

18. The process of claim 14 wherein said converting of step (e) comprises catalytic pyrolysis in a riser reactor.

19. A biomass conversion system comprising:
   a first biomass source for providing a first biomass feedstock;
   a first biomass transport system coupled to said first biomass source and operable to transport said first biomass feedstock away from said first biomass source at a first feed rate, wherein said first biomass transport system comprises a first metering device for controlling said first feed rate;

a second biomass source for providing a second biomass feedstock;

a second biomass transport system coupled to said second biomass source and operable to transport said second biomass feedstock away from said second biomass source at a second feed rate, wherein said second biomass transport system comprises a second metering device for controlling said second feed rate;

one or more analyzers for determining the value of at least one key parameter of said first and second biomass feedstocks;

a controller, having an operator-entered optimal key parameter set point, for determining said first and second feed rates based on a comparison of said optimal key parameter set point with the determined values of said key parameter for said first and second biomass feedstocks; and a biomass conversion reactor for receiving said first and second biomass feedstocks transported by said first and second biomass transport systems.

20. The system of claim 19 further comprising a mixer for receiving and mixing said first and second biomass feedstocks transported by said first and second biomass transport systems to thereby form a blended biomass feedstock, wherein said biomass conversion reactor is configured to receive said blended biomass feedstock from said mixer.

21. The system of claim 19 wherein said analyzers are online analyzers that measure said key parameter while said first and second biomass feedstocks are being transported by said first and second biomass transport system.

22. The system of claim 21 wherein said controller is an automatic controller configured to receive signals from said analyzers and determine an appropriate signal to be sent to said first and second metering devices.

23. The system of claim 19 wherein said at least one key parameter is a compositional property or fluidization property, wherein said compositional property is selected from the group consisting of lignin content, mineral content, carbon content, hydrogen content, oxygen content, natural oil content, hemicelluloses content, cellulose content, extractives content, water content, and ratios of any two of the preceding properties, wherein said fluidization property is density, particle cohesion force, or particle size.

24. The system of claim 19 wherein said biomass conversion reactor is a riser reactor.

* * * * *